April 9, 1957

L. W. MILLER ET AL

2,788,134

AUTOMATIC LOADING STATION

Filed Dec. 30, 1955

INVENTORS
L.W. MILLER
W. R. STAMLER

BY      W. E. Sherwood

ATTORNEY

United States Patent Office 2,788,134
Patented Apr. 9, 1957

2,788,134

AUTOMATIC LOADING STATION

Labron W. Miller and William Raymond Stamler, Paris, Ky., assignors to The W. R. Stamler Corporation, Paris, Ky., a corporation of Kentucky Application December 30, 1955, Serial No. 556,555

7 Claims. (Cl. 214—42)

This invention relates to an improved automatic loading station apparatus and more particularly to a pressure fluid actuated apparatus adapted for the substantially uniform loading of a series of cars. The invention is directed generally to an arrangement of apparatus by means of which a series of cars are loaded to a predetermined height, shifted as needed to continue the loading operation, and loaded without appreciable spilling of material, all without requiring the personal attention of an operator. For purposes of illustration, the invention is described in connection with its employment in a coal mine, although it is not limited in any way to this particular usage, and on the contrary is intended for general use in loading of loose materials.

As an important feature, there is provided an improved reversible fluid driven transfer conveyor arranged to prevent spilling of material between adjacent cars when changing from a fully loaded car to the next empty car and having a compact configuration particularly suitable for use in confined space, such as often encountered in mines. Use of transfer conveyors is not new, but so far as known, those employed prior to this invention have possessed certain inherent disadvantage, which it is an object of this invention, to overcome.

In fact, the maintenance requirements on such conveyors and the general necessity for having an operator stationed at the loading point to reverse the conveyor, have mitigated against the installation of transfer conveyors and have often contributed to the retention of the older massive loading hoppers, even though these require undesirably large head room in the mine.

In order to handle material at rates commensurate with the capacity of the main conveyor, the transfer conveyor is generally loaded with an amount of material comprising a heavy weight. Such conveyors also need to be reversed quickly while carrying this heavy weight. Consequently, the direct gearing of the transfer conveyor to the main conveyor; the driving of the transfer conveyor by mechanical gearing from a reversible electric motor or by reversible clutches; or the use of intermittently operable transfer conveyors have all possessed the disadvantages of receiving heavy shocks when the heavy load is applied or relieved from the conveyor driving mechanism. In contrast therewith, the present invention utilizes a readily controllable pressure fluid for driving the transfer conveyor with advantageous cushioning characteristics on the conveyor drive as such fluid is applied and released. Moreover, with this invention the main supply conveyor preferably runs continuously, while the cars are being shifted.

An object of the invention is to provide an automatic loading station having a pressure fluid car spotter apparatus operable in combination with a pressure fluid driven transfer conveyor.

A second object is to provide a pressure fluid driven transfer conveyor operable in dependence upon the position of cars receiving material from the conveyor.

A third object is to provide an improved automatic loading station including a pressure fluid driven transfer conveyor from which spillage of material is substantially prevented, and by means of which a more efficient loading of cars is achieved.

Another object is to provide an improved pressure fluid driven transfer conveyor.

Another object is to provide an improved pressure fluid system for operating an automatic loading station.

Still a further object is to provide an automatic loading station operated by a pressure fluid system having a safety arrangement responsive to failure of fluid pressure.

Other objects and advantages will become apparent as the description proceeds and when considered in conjunction with the accompanying drawings in which.

As will be noted from Figs. 1 to 12, inclusive, it is apparent that the reversible transfer conveyor indicated generally at 10, preferably occupies a relatively fixed position with respect to a main line conveyor 11 extending into a mine entry or other location for receiving loose material. In addition, and in contrast to prior inventions in this field, such as exemplified by McCarthy Patent 2,659,498, all material to be loaded in the cars passes over the transfer conveyor. With these features in mind, reference now is made to Figs. 1 to 8, wherein a sequence for loading a trip of cars is disclosed.

By means of a pressure fluid actuating system having circuits later to be described, the trip of cars is advanced for loading purposes and is loaded to a substantially uniform height under control of a height control means disposed in a second circuit of the system. Furthermore, the transfer conveyor is actuated to move in the appropriate direction to load the cars under control of a car engaging control means disposed in a first circuit of the system.

The height control means may comprise a ball 12 later to be described. An emergency means 13 likewise is provided for a purpose later to become apparent. The car engaging control means may include a first finger element 14 and a second finger element 15 mounted upon a framework 16 alongside the track and spaced closely adjacent to the sides of the cars.

A conventional car shifting apparatus herein called the car spotter and operable in the second circuit of the pressure fluid system, is mounted adjacent the track rails and serves to provide the controlled advance of the trip of cars. The car shifting mechanism disclosed in Stamler Patent 2,606,504 is preferred for use with our invention. As indicated generally in Figs. 9 and 11, the Stamler car spotter comprises a pair of rails 17 and 18, with a central rail 19 therebetween, all removably affixed as a unit to the cross ties 20, forming a part of the car trackway. The car spotter lies between the main rails 21 and 22 of the trackway, and contains a pair of pressure fluid cylinders 23 and 24, from which project a pair of piston rods carrying car engaging members or barneys, 25 and 26, for the purpose of shifting the cars as needed. As noted in Fig. 9, the barneys preferably engage with depending members 27 and 28 on the respective cars, thus enabling the trip of cars to be moved; for example, to the left as shown in this figure. The barneys are spring pressed to remain normally in an engaging upper position relationship with respect to the cars, but as well known, may be depressed to permit a trip of cars to be backed into loading position and also may be depressed as the piston rod connected thereto is moved backwardly by the pressure fluid system.

Figure 1:
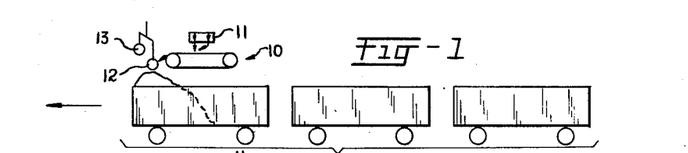
Figs. 1 and 2 are schematic views in side elevation and plan respectively, showing the direction of car travel and with the car engaging fingers in the position occupied at the time the transfer conveyor begins to fill a car and is continuing to rotate in a forward direction.
Figure 2:
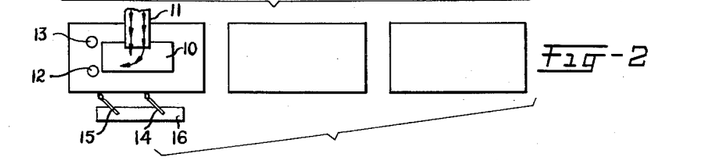

With the car spotter positioned under the trips of cars shown in Figs. 1 and 2 the following sequence of operation is described for a better initial understanding of the invention.

Both fingers 14 and 15 are deflected to the left by the cars, a condition which represents the most commonly occurring operating condition of the loading station. The transfer conveyor thus is discharging in its forward direction and the loading of the forward car is in progress. As the car spotter intermittently moves the trip of cars to the left, as governed by the height control means 12, the finger 14 first returns to a free position and then again to a deflected position.

Figure 4:
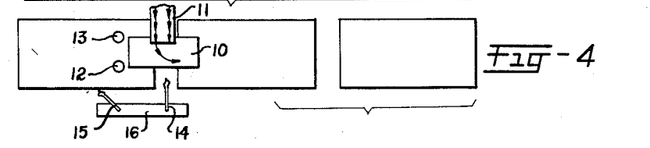

However, as the forward car is loaded and the finger 14 moves to the free position of Fig. 4, the transfer conveyor 10 is reversed and delivers material into the following car. The car spotter at this time rapidly moves the trip of cars continuously forward until finger 15 reaches its free position, shown in Fig. 6 at which time the conveyor 10 again resumes its travel in the forward direction with the height control means 12 again resuming its control over the car spotter. Thereafter, finger 15 is again deflected to the left as shown in Fig. 2.

This sequence continues until the last car is loaded and both fingers 14 and 15 return to a free position at which time both conveyors 10 and 11 are brought to a halt. At this time a locomotive or other means may be employed to move the loaded trip of cars and to bring in and initially spot the next trip of cars to be loaded.

Figure 13:
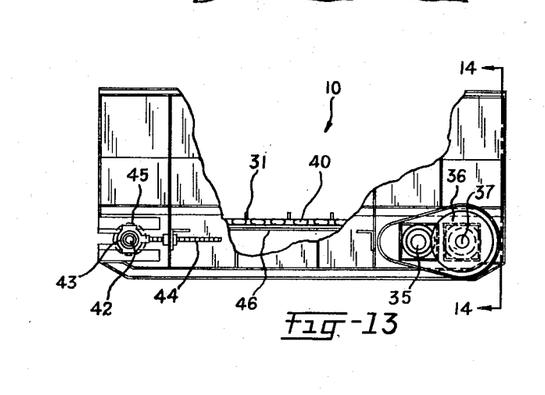
Fig. 13 is a broken away side elevation of the improved reversible pressure fluid driven conveyor.
Figure 14:
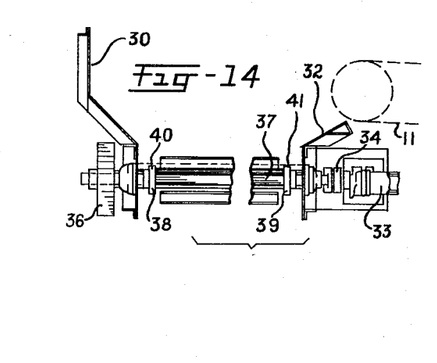
Fig. 14 is a sectional view of the conveyor taken along line 14—14 of Fig. 13.

With this operation in mind, reference is made to Figs. 13 and 14 showing a preferred form of the improved transfer conveyor. It will be understood that the conveyor may be mounted in any suitable convenient manner above the cars to be loaded, and with respect to the main line conveyor 11, from which it receives material. When used in a mine, for example, the transfer conveyor may be provided with supporting means not shown, for suspending the same from the mine roof.

One form of the transfer conveyor 10 may comprise a frame having an elongated upstanding back board or wall member 30, adapted to intercept any material tumbling off the conveyor 11, and to redirect such material upon a series of movable flights 31. In lieu of such flights, a belt or equivalent material transporting means may be used. At its other side, the conveyor may have a relatively shallow wall member 32 extending into material receiving relation under conveyor 11, and inclined to direct material upon the moving flights, or other conveying means. In general, the overall height of the transfer conveyor does not exceed the heights of material passing over the main conveyor 11, and thus the headroom of the mine tunnel need not be enlarged to employ the apparatus of this invention. Rather than having the wall members 30 and 32 mounted upon the conveyor frame these elements may be separately mounted from any conveniently located support.

A conventional reversible fluid pressure motor 33, connected through coupling means 34, is mounted on one side of the transfer conveyor and is adapted to run at comparatively high speeds. This motor drives a power shaft 35 disposed intermediate the ends of the transfer conveyor. At its opposite end the power shaft drives a gear in gear reduction box 36, and from which gear reducer a conveyor head shaft 37 is driven at reduced speed. The speeds of the motor and shafts are so chosen as to relate the capacity of the transfer conveyor to the capacity of the main line conveyor, to the end that all material delivered by the latter may be promptly moved into the empty cars. Suitable sprocket wheels 38 and 39 are mounted upon shaft 37, interiorly of side walls 30 and 32 and drive chains 40 and 41, carrying the transverse flights 31 therebetween, are adapted to be driven by these wheels. Adjacent its other end, the conveyor frame mounts a transverse take-up shaft 42, journalled in movable take-up bearings 43, such bearings being adjustable lengthwise of the conveyor frame by a suitable take-up screw 44. Adjacent its ends, shaft 42 is provided with sprocket wheels 45, over which the drive chains are adapted to move. A pan 46 lying beneath the upper orbit of the flights and mounted upon the frame of the conveyor, serves to support the loose material as it is moved to one end, or the other, of the transfer conveyor.

Figure 11:
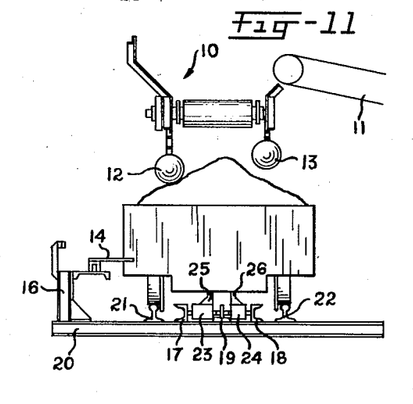
Figure 12:
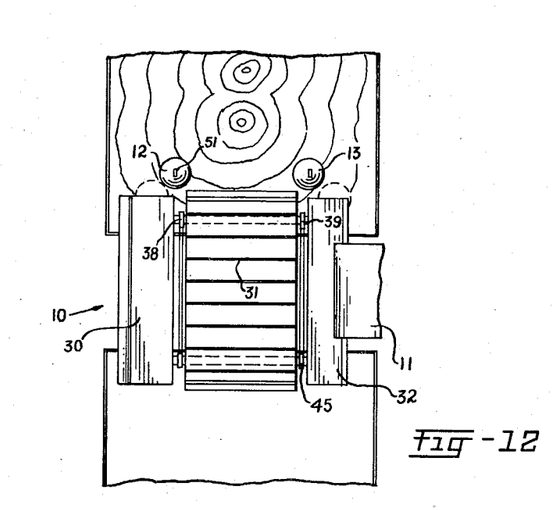
Fig. 12 is a plan view of the conveyor apparatus showing the relative location of the control means for determining the height of car loading.

As best shown in Fig. 12, the improved transfer conveyor 10 is mounted for discharge along the central longitudinal axis of the cars, and as material is discharged into a car it tends to form a conical pile. As this grows in height, it also spreads laterally and unless the conveyor discharge is controlled, the material would spill over the sides of the car. Accordingly, there is provided as part of the invention, an improved means for shifting the cars as needed to prevent this occurrence. One satisfactory means, hereinafter called the second control means of the pressure system, comprises a relatively large and heavy control ball indicated generally at 12. This ball preferably is suspended from a rigid member or support 50, which supports not only the control ball, but also the cooperating pressure fluid system conduits and valves, not shown in Figs. 9, 11 or 12, but shown in Figs. 15a and 15b.

Figure 9:
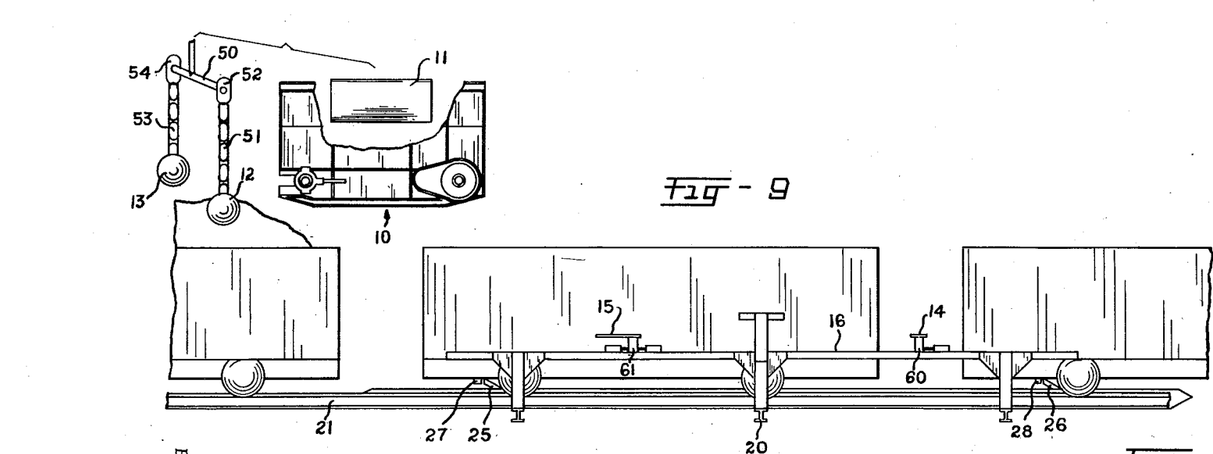
Fig. 9 is a diagrammatic view to a larger scale showing one arrangement of the automatic loading station, the pressure fluid conduits being omitted, and the car engaging fingers being in the position indicated by Figs. 3 and 4.

As shown in perspective in Fig. 9, the control means may comprise the ball 12 and a suspending means 51 adapted to permit the ball to hang by gravity and having at its upper end a cam means 52, which is actuated when the ball 12 moves a predetermined extent laterally of the car. A supplementary, or emergency portion of the control means may comprise ball 13 and a suspending means 53 adapted to permit that ball to hang by gravity and having at its upper end a cam means 54 which is actuated when the ball 13 moves a predetermined extent laterally of the car. Both balls are suspended adjacent and at opposite sides of the transfer conveyor discharge, as it discharges in its forward direction. Moreover, the emergency control ball is mounted to hang at a somewhat higher elevation than the other control ball, so that material avalanching down the sides of a growing pile will first actuate the control ball 12.

Since the movement of both balls along the generally longitudinal, or travel, axis of the cars is desired without movement of the cams, it is preferred to employ as suspending means therefor, an element having a lost motion action when moving on the axis of car travel. One simple means may comprise suspending members formed of drive chains whose pins are along an axis generally transverse to the travel axis of the cars. When material slides down the pile and contacts the control ball or balls, the chains accordingly resist the vector of force which is transverse to the car and act as a rigid lever tending to move the attached cam at the upper end of the chain and to actuate the valve associated with such cam, as will later be described. As shown by the dotted line position of Fig. 12, the balls 12 and 13 preferably move at an angle of about 45° to the direction of car travel as they are actuated by the material sliding down the sides of the pile within the car.

Figure 10:
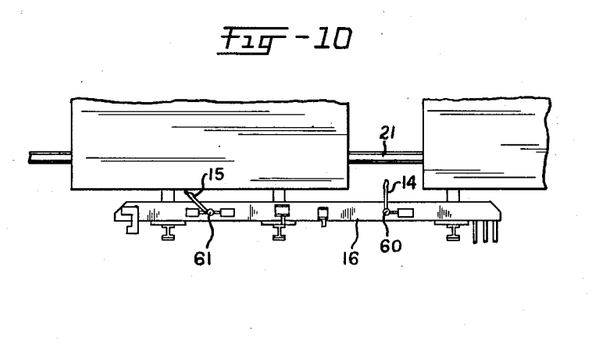
Figs. 10 and 11 are a partial plan view and an end elevation view, respectively, to a smaller scale, showing the arrangement of apparatus depicted in Fig. 9.

Referring now to Figs. 9 to 11, the car engaging control means, or fingers, 14 and 15, hereinafter called the first control means of the pressure system, are shown as mounted upon a frame 16 along the track. As in the case of the mounting of the control balls for determining the height of load, frame 16 is mounted at a location commensurate with the length of cars being employed and with the length of transfer conveyor 10 being used. The length of transfer conveyor is chosen so as to completely span the space between adjacent cars, and to provide that when the final filling of a forward car is interrupted by movement of control ball 12, the conveyor will deliver into the next car without spillage between cars.

Figure 15A:
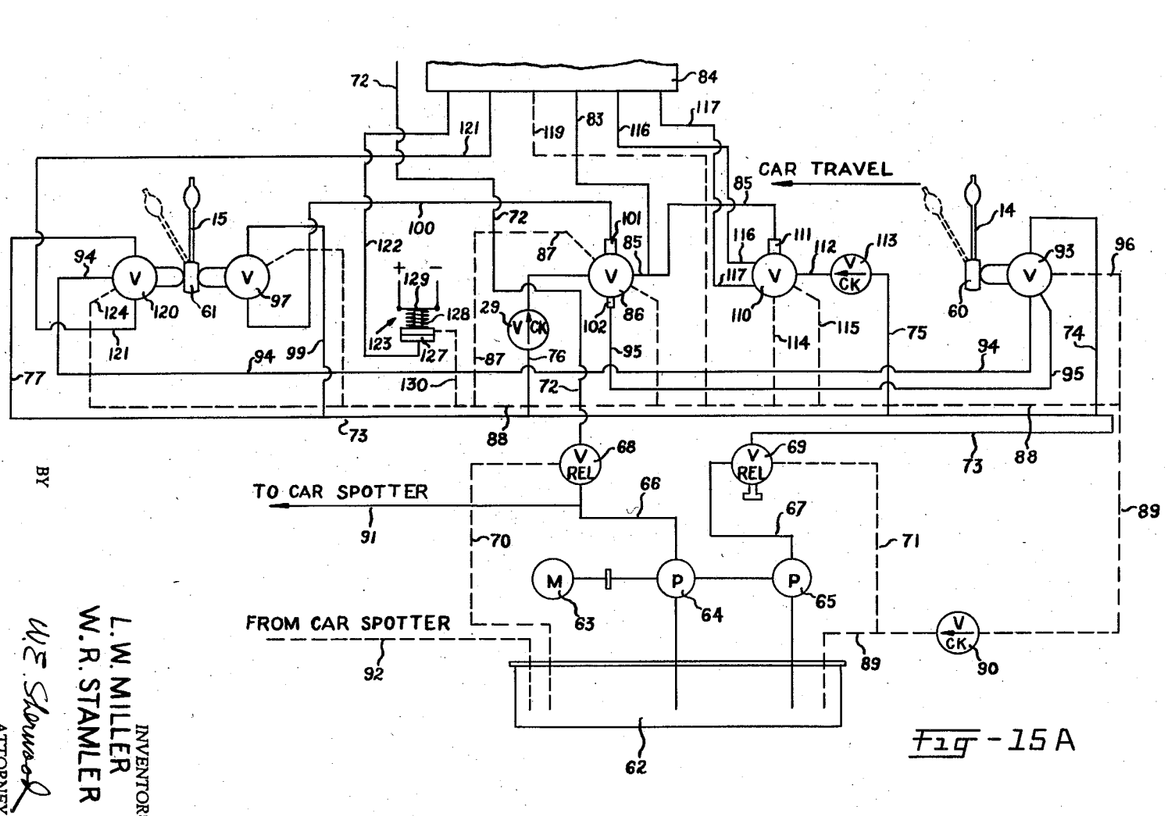
Figs. 15A and 15B are complementary diagrammatic views of the fluid pressure system for the automatic loading station, the fluid returns being indicated in dotted lines

Both fingers 14 and 15 may be spring centered upon the mounting frame 16, so that when disengaged from the side of a car, they assume a free position generally normal to the axis of the tracks. These fingers may comprise relatively rigid spring steel members having an appropriate length to engage the cars, but short enough to be flexed in either direction by such cars without breakage. At the base these fingers or levers are provided with the respective cams 60 and 61 (Fig. 15A). The pivotal spring centered mounting of the fingers and attached cams is such that the fingers not only will normally return to their free position automatically upon disengagement from the cars but also can be wiped along the sides of the cars as such cars travel in either direction.

Figures 15B, 16:
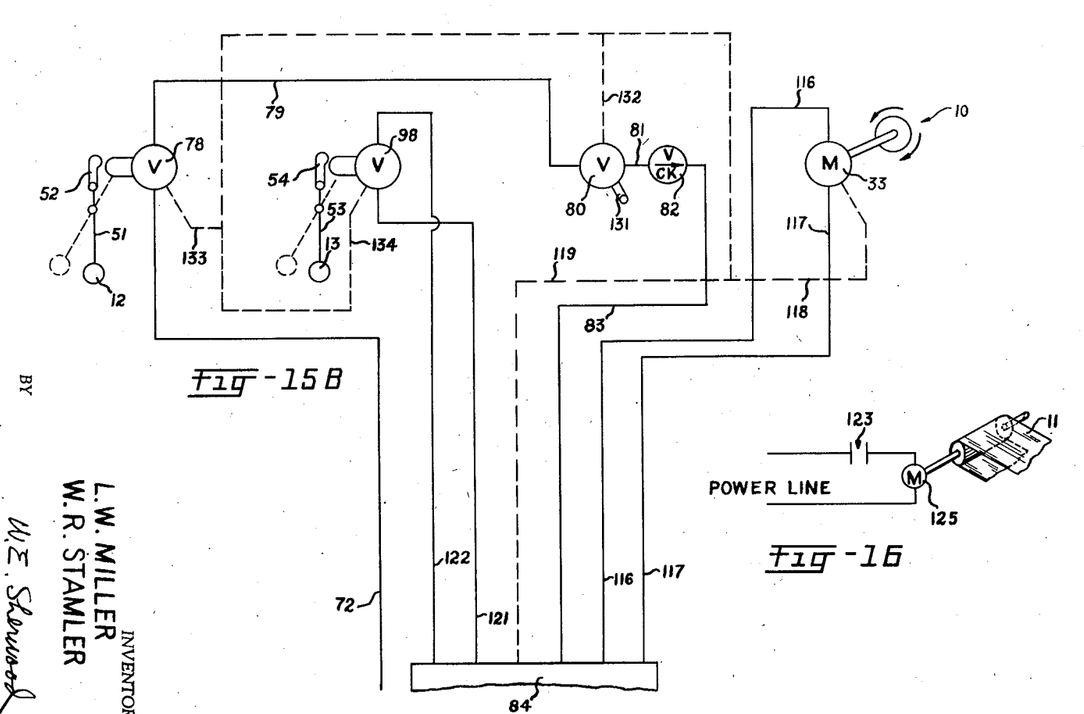
Fig. 16 is a schematic view indicating the relationship of the pressure switch to the main conveyor drive.

With the foregoing description of the improved transfer conveyor, car spotter, height of load control means, and car actuated control means, in mind, reference now is made to Figs. 15A and 15B showing the various circuits of the improved pressure fluid actuating system by means of which the car loading operation may be accomplished.

A fluid reservoir 62 may have mounted thereon a conventional electric motor 63 driving a pair of conventional pumps 64 and 65. Pump 64, hereinafter called the second pump, may develop in its outlet line 66 pressures ranging up to 2,000 pounds per square inch, while pump 65, hereinafter called the first pump, may develop an equally high or preferably a somewhat lower pressure in its outlet line 67. The pressure in line 66 may be controlled by a conventional relief valve 68 (a suitable type being illustrated by Vickers valve type CT–10–C–10) and the pressure in line 67 may be controlled by a conventional relief valve 69 (a suitable type being illustrated by Vickers valve type CT–06–B–10 with plugged vent connection). These valves drain respectively into reservoir 62 by means of drain lines 70 and 71, and each valve is provided with the usual manual adjusting means for determining the pressure relief setting, and accordingly the maximum pressures to be attained in the pressure outlet lines 91 and 73.

Line 73 comprises a pressure manifold line, forming a part of what is hereinafter called the first circuit of the pressure system, and from which lines 74, 75, 76, 77 and 99 extend to other valves later to be described, and which lines for purposes of illustration may contain pressure fluid maintained at a pressure in excess of 125 pounds per square inch. Line 72, on the other hand, normally passes fluid continuously through valve 78, line 79, through valve 80, line 81, check valve 82, line 83 mounted in gathering block 84, pilot line 85, valve 86, drain line 87, and drain return lines 88 and 89 through check valve 90 back into reservoir 62. When any of the valves 78, 80 or 86 are actuated to cause blocking of the flow of fluid in line 72, a high pressure is immediately built up by pump 64 and is transmitted to the car spotter means through line 91, forming a part of what is hereinafter called a second circuit of the pressure system. This line 91 represents the actuating fluid line into the expansible chambers shown in the aforesaid Stamler Patent 2,606,504. Drain line 92 leading into reservoir 62, represents the drain line from those car spotter expansible chambers shown in the patent.

Application of pressure to the pressure switch governing the actuation of the main line conveyor is under the control of the car engaging fingers 14 and 15, which are required to operate in a predetermined sequence, as will later become apparent. Finger 14, through its cam 60, may, when moved to the left into deflected position, shift the position of a conventional four-way pilot valve 93, so as to establish connection between line 74 and line 94, and simultaneously to vent pilot line 95 into drain line 96 and thence into return drain 89. Valve 93, as well as valves 97 and 98, may be of any conventional type, such, for example, as Vickers valve type C–572–E.

In comparison, finger 15, while in its free position, permits pilot valve 97 to pass pilot pressure from line 99 into pilot line 100 for the purpose of shifting valve 86. This valve 86 may be a conventional four-way valve, having interior friction pads to maintain an established valve position and provided with differential pistons as indicated at 101 and 102. One suitable form of such valve is exemplified by the Vickers valve type 440–S5–G.

Pilot line 85 leading from valve 86 connects with the conveyor movement control valve 110, which may conveniently comprise a conventional four-way spring offset valve of the type having a piston 111 opposing a spring not shown. One suitable form of such valve is exemplified by Vickers valve type 482–S8. Leading from valve 110 is a pressure line 112 adapted to connect with line 75 through a conventional check valve 113, normally set for movement at about 125 pounds pressure. Suitable drains 114 and 115 are provided for venting of valve 110.

Leading from conveyor control valve 110 are lines 116 and 117 forming a part of the first circuit of the pressure system and leading into opposite sides of the pressure fluid motor 33, serving to drive transfer conveyor 10. A common drain line 118 from the motor connects with drain line 119, passing through block 84 and into drain return lines 88 and 89.

Finger 15 when moved to the leftmost deflected position is adapted to actuate a two-way pilot valve 120 of the same type as valve 78, and which may be exemplified by the Vickers valve type C–552–E. With the finger so deflected, fluid from line 77 passes through the valve 120 and into line 121, thence through emergency control valve 98 into line 122 and to the pressure switch indicated generally at 123. Normally, with finger 15 in its free position, finger 14 will be in its deflected position and thus substitute fluid from line 94 passes through the valve 120 and into line 121 to maintain pressure upon that switch. Flow to the pressure switch from either of lines 77 or 94, is referred to hereinafter as a part of the pilot pressure circuit connected to the first circuit under control of the first control means. A drain 124 is provided for valve 120, as shown.

As a feature of the invention, the pressure switch 123 is adapted to open whenever the pressure in line 122 falls below a prescribed value, as, for example, 80 pounds per square inch. Operation of emergency control ball 13; breaking of a pressure fluid line; failure of the electrical power supply; or completion of the loading of a trip of cars; are examples of occasions when this switch operates to shut down the apparatus. As shown in Figure 16 the pressure switch 123 is located in the main power circuit feeding the motor 125 driving main line conveyor 11. Any conventional pressure switch adapted to open upon failure of pressure may be used, such a switch preferably comprising a piston 127 opposed by a spring 128, and serving to actuate a switch blade 129. A drain 130 from the piston cylinder also is provided. For the purpose of effecting movement of the car spotter in order to move cars in an emergency (when otherwise the system would not be actuating the car spotter), the simple rotary pilot valve 80 which can be actuated manually by handle 131, is provided. A drain 132 from this valve, as well as drains 133 and 134 from the valves 78 and 98 respectively, are also provided.

By means of the apparatus described above it now is possible to accomplish the objectives of the invention without requiring the constant attention of an operator.

Referring once more to Figs. 1 to 8, the following preferred method of automatic loading may now be described. At the start, the main line conveyor is at rest since pressure switch 123 is open. The control balls 12 and 13 are hanging vertically, fingers 14 and 15 are in the free position and motor 63 is driving pumps 64 and 65, with the car spotter means inactive.

A locomotive or other agency backs a trip of cars along the track and spots the outby end of the first car in position under the forward loading end of conveyor 10 and under control balls 12 and 13. The locomotive may then be uncoupled and used for other purposes during the loading process. Since the operation of the pressure fluid system can occur only when fingers 14 and 15 are moved in a prescribed direction in a prescribed sequence, no loading begins until the two fingers are both deflected to the left by the spotting of the outby end of the first car. With both fingers then deflected to the left, the loading as shown in Fig. 1 occurs as follows:

Deflection of finger 14 causes pressure fluid to flow from line 74 through line 94, valve 120 and into line 121, through valve 98 and into line 122 to actuate pressure switch 123 and to start main conveyor 11. Simultaneously, pilot line 95 is drained into line 96. Finger 15 is also deflected to the left blocking flow from line 99 through valve 97 into line 100 and also blocking communication between line 77 and line 121. Due to the internal friction pads in valve 86, that valve of its own accord does not shift position when pressure is relieved on its smaller piston 102 and thus remains in its venting position which it occupied before the loading cycle began.

As a result, pressure fluid from pump 64 vents through relief valve 68, passes through valves 78, 80 and 82 into line 83, thence through valve 86 into drain line 87. Simultaneously, pilot line 85 is vented through valve 86. Since this venting pressure is less than that required to operate the car spotter, no movement of that spotter takes place, although at least one of the barneys 25 and 26 is in the engagement with a car.

Pressure in pilot line 85 is not sufficient, moreover, to overcome the spring resistance in conveyor control valve 110, and the spring, therefore, holds that valve in position connecting line 75 at a pressure of at least 125 pounds per square inch with line 117, and permitting the conveyor motor 33 to run in the forward direction.

As the pile of material increases in the car, control ball 12 is actuated causing valve 78 to block flow through line 72 and permitting pressure to rise in line 66 whereupon the car spotter is actuated to move the trip of cars sequentially forward until the control ball 12 again falls free of the material thus reopening valve 78 and permitting the pressure to fall, thus stopping the car spotter. During the thus described operation valve 86 has remained in venting position and conveyor 10 has continued to move in its forward direction.

Figure 3:
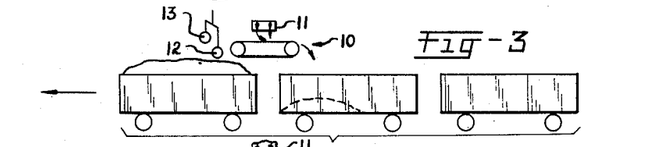
Figs. 3 and 4 show the conveyor in reverse rotation.

By the time the first car is fully loaded, as seen in Fig. 3, finger 14 returns to its free position and finger 15 remains deflected. Movement of finger 14 to the free position shifts valve 93 to cause fluid from line 74 to pass into pilot line 95 and to act upon the smaller piston 102 of valve 86. This then overcomes the action of the valve friction pads and shifts valve 86 into a blocking position. It will be understood that at the same time finger 14 falls free, the control ball 12 has operated valve 78 and blocks line 72, thus initiating the advancing motion of the car spotter apparatus. This relationship occurs as a result of locating the control balls, transfer conveyor, and fingers 14 and 15, so that the finger 14 falls free at the time the car is fully loaded.

As valve 86 shifts to its blocking position, pilot pressure in line 85 is supplied initially through check valve 29 from line 76, and passes through the shifted valve 86 into pilot line 85, and connecting line 83. Due to the presence of check valve 82, that pressure, however, is transmitted no further than check valve 82. Pressure built up in line 85 acts upon piston 111 of valve 110 and shifts that valve against the action of its spring. This action then permits fluid to pass from line 75 through check valve 113 and line 112, through valve 110 and into line 116. Such fluid then flows through the conveyor circuit into motor 33 and drives the conveyor in the reverse direction indicated in Figs. 3 and 4.

Figures 5, 6:
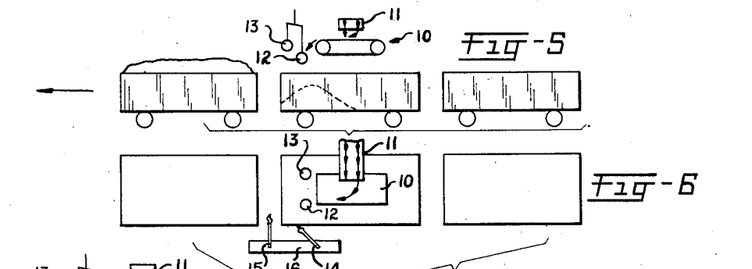
Figs. 5 and 6 are schematic views showing the car engaging fingers in the position occupied when a subsequent car has been advanced for a subsequent forward motion of the transfer conveyor.

During the reverse drive of motor 33 material is loaded into the next empty car and the car spotter means rapidly advances the trip of cars until the outby end of the car then receiving material from the conveyor is positioned as shown in Figs. 5 and 6. As this car shifting cycle occurs, the control ball 12 swings free, opening valve 78 and also finger 15 falls free and finger 14 is again deflected. While the car spotter is operating continuously to effect this rapid car cycle shift, fluid in lines 72, 79 and 83 is at a pressure at least as high as that in pilot line 85, but is prevented from flowing into line 76 by the blocking action of check valve 29.

While valve 86 remains in the thus described blocking position, the control normally exerted by control ball 12 with its valve 78 open, is overridden and the car spotter is continuously operated until finger 14 is deflected, whereupon valve 93 is moved to connect line 74 with line 94 and to vent line 95 into line 96. When this shift of valve 93 occurs, pilot pressure upon the pressure switch is again established through line 94, as before described.

Upon the release of pressure in line 95, the spool of valve 86 does not, of its own accord, shift to the open venting position, since the friction pads are sufficient to prevent this voluntary movement. When, however, finger 15 falls into its free position, as in Fig. 6, the car spotting action is completed and control ball 12 with its valve 78 in open position is ready to take over control from the overriding valve 86. Thus as finger 15 falls free, valve 97 is actuated to apply pressure again from line 99 into pilot line 100. This pressure applied to the larger piston 101 of valve 86 overcomes the holding action of the friction pads and shifts that valve into its formerly open position.

At this time line 83 then vents into drain line 87 and stops movement of the car spotter. Secondly, this valve movement drops the pilot pressure in line 85 by also venting into drain 87 and thus permits the spring of valve 110 to shift that valve again. Fluid thereupon flows from line 75, through check valve 113, line 112, valve 110 and into line 117, and thence through motor 33 again driving the transfer conveyor in its forward direction. Thereafter, the conveyor continues to fill the car under control of ball 12, effecting periodic movements of the car spotter means as above described.

Figure 7:
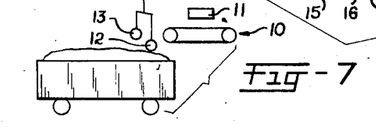
Figs. 7 and 8 are schematic views showing the car engaging fingers in the position occupied when no more empty cars are available for filling.
Figure 8:
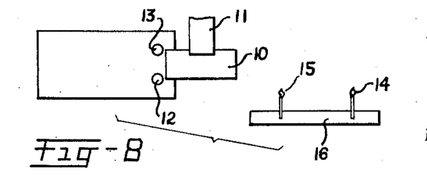

This sequence of operations continues during the loading of the trip of cars until the last car is reached, as shown in Figs. 7 and 8. It will be noted that, during the loading of the last car, the transfer conveyor runs in its forward loading direction, and that its circuit connection is such that upon starting the loading of a second trip of cars, it also begins its operation in a forward loading direction.

As finger 14 falls free during the loading of the last car, pilot pressure for the pressure switch is provided by the deflected finger 15, supplying fluid from line 77 through valve 120 into line 121 and thence through line 122 to the switch. However, as soon as finger 15 also falls free, as shown in Fig. 8, valve 120 is shifted to interrupt communication between lines 77 and 121, and since valve 93 controlled by finger 14 is no longer capable of supplying substitute pressure through line 94, the pressure in line 121 drops and switch blade 129 of pressure switch 123 opens, thus bringing the main line conveyor 11 to a halt.

At the same time, with both fingers 14 and 15 in the free positions, pilot pressure is being applied through line 100 to the piston 101, and through line 95 to the piston 102 of valve 86. Since the size of piston 101 is the greater, the valve 86 accordingly is positively held in its venting position and insures that there can be no undesired actuation of the car spotter means after the last car is filled.

One additional advantage of this arrangement is that during the interval between the loading of the first trip of cars and the start of loading of the second trip of cars, the entire pressure system remains active with the valve 86 in its venting position. Accordingly, all that is required to initiate the next cycle of loading is for finger 14 to be deflected, followed by deflection of finger 15.

Various refinements of the above described apparatus may be made by those skilled in the art as desired. For example, control ball 13 may be linked with control ball 12 through any conventional linkage, not shown, so that actuation of control ball 13, may first operate to close valve 78 for a period of time sufficient to move the trip of cars a prescribed distance before the emergency valve 98 is closed. If, during such movement of the cars, the control action of ball 13 is relieved, then pressure upon pressure switch 123 need not be broken and the shutdown of conveyor 11 need not occur. However, if such movement of the cars does not relieve the control action of ball 13, the valve 98 may then be operated as above described.

Having thus described our invention, it will be apparent that the apparatus employed therein is suitable for use in difficult environments and will be found especially desirable for use in installations wherein dust and moisture are present. The pressure fluid system and other apparatus may be compactly arranged and have no special space requirements. It will be appreciated that while one form of apparatus has been described in detail, the invention is not limited solely to the apparatus as shown. On the contrary, it is intended that the invention is to be limited only as described in the appended claims.

What is claimed is:

1. Car loading apparatus comprising in combination, a main conveyor, a transfer conveyor receiving material from said main conveyor and disposed above the cars to be loaded, said transfer conveyor having a length sufficient to span the space between adjacent cars, a reversible fluid pressure motor for driving the transfer conveyor in either direction thereby to discharge into either of two adjacent cars, fluid pressure operated car shifting means, a fluid pressure system having a first circuit for passing fluid into said conveyor motor, and a second circuit for passing fluid into said car shifting means, a first control means operable in dependence upon the position of said cars for directing the flow of fluid through said system in order to operate the said motor, and a second control means operable in dependence upon the heights of material loaded into said cars by said transfer conveyor for directing the flow of fluid through the second circuit of said system in order to operate the car shifting means.

2. Apparatus as described in claim 1, including a first pump for moving a pressure fluid through said first circuit, a second pump for moving a pressure fluid through said second circuit, and means for driving said pumps.

3. Car loading apparatus comprising in combination, a main conveyor, a power circuit for operating said main conveyor, a pressure switch in said circuit serving to open said circuit at a predetermined pressure, a transfer conveyor receiving material from said main conveyor and disposed above the cars to be loaded, said transfer conveyor having a length sufficient to span the space between adjacent cars, a reversible fluid pressure motor for driving the transfer conveyor in either direction thereby to discharge into either of two adjacent cars, fluid pressure operated car shifting means, a fluid pressure system having a first circuit for passing fluid into said conveyor motor, a second circuit for passing fluid into said car shifting means, and a pilot pressure circuit from said first circuit to said pressure switch, a first control means operable in dependence upon the position of cars for directing the flow of fluid through the first and pilot circuits of said system in order to operate the conveyor motor and to hold the pressure switch closed during normal loading operation, and a second control means operable in dependence upon the height of material loaded into said cars by said transfer conveyor for directing the flow of fluid through the second circuit of said system in order to operate the car shifting means.

4. Apparatus as described in claim 3, wherein said second control means includes a member positioned above the car adjacent to one end of said transfer conveyor for actuation by material deposited in said car by the conveyor, and a valve in said second circuit of the pressure system actuated by movement of said member for interrupting flow of fluid through the portion of said second circuit containing said valve when said valve is moved in one direction, and for reestablishing flow through that portion of said second circuit when said valve is moved in an opposite direction.

5. Apparatus as defined in claim 3, wherein said pilot pressure circuit includes a member positioned above the car adjacent the end of the transfer conveyor for actuation by material deposited in said car by said conveyor and a valve in said pilot pressure circuit to said pressure switch actuable by movement of said member for interrupting the pressure applied in said pilot circuit when said valve is moved in one direction and for reestablishing the pressure applied in said pilot circuit when said valve is moved in an opposite direction.

6. Car loading apparatus comprising in combination, a main conveyor, a transfer conveyor receiving material from said main conveyor and disposed above the cars to be loaded, said transfer conveyor having a length sufficient to span the space between adjacent cars, a reversible fluid pressure motor for driving the transfer conveyor in either direction thereby to discharge into either of two adjacent cars, fluid pressure operated car shifting means, a fluid pressure system having a first circuit for passing fluid into said conveyor motor, and a second circuit for passing fluid into said car shifting means, a first control means for directing flow of fluid through the first circuit of said system, in order to operate said conveyor motor, and a second control means operable in dependence upon the height of material loaded into said cars by said transfer conveyor for directing flow of fluid through said second circuit of said system in order to operate the car shifting means; said first circuit including a spring opposed piston valve for directing fluid to said conveyor motor in one direction when said spring is unopposed and for directing fluid to said motor in an opposite direction when said spring is opposed, a differential piston valve for shifting said spring opposed piston valve, a pilot pressure line extending between said piston valves, first and second four-way pilot valves, said first pilot valve serving to exert pressure upon the smaller piston of the differential piston valve, when moved in one direction, and to vent said pressure when moved in an opposite direction, said second pilot valve serving to exert pressure upon the larger piston on the differential piston valve, when moved in one direction, and to vent such pressure, when moved in an opposite direction; and said first control means including a car actuated lever for moving said first pilot valve and an independent second lever actuated by a car for moving said second pilot valve, whereby sequential movement of said levers permit the spring opposed piston valve to shift in alternate directions and to effect reversals of the rotation of said transfer conveyor motor.

7. Apparatus as defined in claim 6, wherein said differential piston valve is mounted in said second circuit of said pressure system, so as to obstruct flow through a portion of said second circuit while pilot pressure is applied to the smaller piston of said valve and to permit flow through said portion of said second circuit while pilot pressure is applied to the larger piston of said valve.

References Cited in the file of this patent
UNITED STATES PATENTS

| | | |
|---|---|---|
| 874,475 | Yost | Dec. 24, 1907 |
| 2,572,687 | Anderson et al. | Oct. 23, 1951 |
| 2,609,080 | Overman | Sept. 2, 1952 |
| 2,659,498 | McCarthy | Nov. 17, 1953 |